United States Patent Office 3,041,375
Patented June 26, 1962

3,041,375
PREPARATION OF ACRYLAMIDE
Suzanne N. Heiny, Midland, Mich., assignor to The Dow Chemical Company, Midland, Mich., a corporation of Delaware
No Drawing. Filed July 6, 1959, Ser. No. 824,963
5 Claims. (Cl. 260—561)

This invention is directed to a novel method for the preparation of acrylamide by the hydrolysis of acrylonitrile.

In accordance with the present invention, it has been discovered that acrylamide may be prepared in excellent yields by reacting acrylonitrile with water in contact with a sulfonic acid-type cation exchange resin in the acid form. It is among the advantages of the invention that the resin may be separated from the reaction products and is thus available for reuse. In one embodiment of the invention, the reaction of acrylamide with water in contact with the cation exchange resin is carried out in continuous fashion with countercurrent elution of the acrylamide product from the resin followed by recycling of said resin in the process. In a further embodiment of the invention, the proportions of water to acrylonitrile in the reaction may be adjusted to produce a mixture of acrylamide and acrylic acid, if desired.

In carrying out the invention, acrylonitrile, water and a sulfonic acid-type cation exchange resin in the acid form are mixed together and heated at a reaction temperature for a period of time to convert the acrylonitrile to acrylamide. Alternatively, the acrylonitrile and resin are heated at a reaction temperature with somewhat higher proportions of water and for longer times to produce a mixture of acrylamide and acrylic acid. The order of addition of the reactants does not appear to be critical. However, it is generally convenient to introduce the water into the reaction system in the form of moisture held on the surfaces and in the interstices of the cation exchange resin. On completion of the reaction the acrylamide product or mixture of acrylamide and acrylic acid is separated from the resin by leaching with water or other suitable solvent. In such operations it is generally desirable to incorporate a polymerization inhibitor such as a soluble copper salt in the reaction mixture and in the leach liquor to prevent any appreciable polymerization of the acrylamide during the preparation and recovery thereof.

The reaction is operable to produce some of the desired acrylamide product with relatively wide variations in proportions of reactants. However, for obtaining practical yields the proportions of reactants and the reaction conditions are critical. Thus, to obtain good yields of acrylamide, it is preferred to employ from about 1.1 to about 1.4 moles of water per mole of acrylonitrile in the reaction. Higher proportions of water to acrylonitrile favor the formation of increasing proportions of acrylic acid in the final product. Similarly, it is desirable to employ an excess of the cation exchange resin and proportions of at least 2 to 3 equivalents of said resin per mole of acrylonitrile are preferred for the production of good yields of acrylamide. In this connection, 1 gram-equivalent of cation exchange resin is defined as that quantity of such resin which contains 81 grams of available sulfonic acid groups.

When operating in accordance with the invention, the acrylonitrile, water and cation exchange resin are mixed together and heated at temperatures of from about 60° to about 120° C. for a period of time to complete the reaction. In such operations, it is generally preferred to carry the reaction out at from about 90° to about 110° C. in a closed vessel under autogenous pressure. The rate of the reaction is dependent on the temperature and longer reaction times are required at temperatures in the lower portion of the operable range. When operating in the preferred range of from 90°–110° C. under autogenous pressure the reaction is usually substantially complete with from 2 to 4 hours' heating.

In a preferred embodiment of the invention the acrylonitrile, water and sulfonic acid resin are mixed together and mechanically conveyed as a moving bed into a zone heated to a reaction temperature. The apparatus is arranged so as to maintain the reactants in contact with the resin at the reaction temperature and under autogenous pressure for a period of at least about 2 hours and the reaction mass is then discharged from the reaction zone through a suitable die or reducing valve into a vacuum chamber equipped with a condenser for recovering volatilized unreacted acrylonitrile. From the vacuum chamber the resin with attendent product is conveyed to and through a column wherein the resin is washed countercurrently with water to produce an aqueous extract consisting of an aqueous solution of acrylamide or of acrylamide and acrylic acid product. Said solution can be employed directly for producing polymers and copolymers of acrylamide or copolymers of acrylamide and acrylic acid, respectively. Alternatively, the solution may be concentrated or evaporated by conventional procedures, if desired, to produce a dry acrylamide product or mixture of dried acrylamide and acrylic acid. The resin issuing from the countercurrent extraction column is dried and recycled to the beginning of the process. Any acrylonitrile recovered from the vacuum chamber may be similarly recycled.

Any sulfonic acid-type ion exchange resin can be employed provided it is insoluble in water and stable at the temperature of the reaction. Thus, suitable resins include cross-linked resins obtained by the condensation of phenolmethylene sulfonic acid with aldehydes, sulfonated coal, cross-linked polymers and copolymers of vinyl sulfonic acid, cross-linked sulfonated polystyrenes and the like. Suitable resins are described in Calmon and Kressman, Ion Exchangers in Organic and Biochemistry, Interscience Publishers, New York, 1957, pages 17–21. The resin is employed in the acid form.

The following examples illustrate the invention but are not to be construed as limiting the same.

*Example 1*

A cation exchange resin (sulfonated cross-linked polystyrene, commercially available as Dowex 50), in the acid form, was dried at a temperature of 110° C. under vacuum. 87 grams (0.47 mole) of this resin was added to a mixture of 6.2 milliliters (0.093 mole) of acrylonitrile, 1.7 milliliters (0.094 mole) of water and 0.01 gram of copper sulfate pentahydrate. The resulting mixture was heated for 2 hours on a steam bath in a glass reaction vessel equipped with a reflux condenser. On completion of the heating, unreacted acrylonitrile was distilled out of the reaction mixture under vacuum and about 100 milliliters of water thereafter added to the residue of the reaction mass. The resin was stirred in the water, filtered and the filter cake washed with water to give a total volume of filtrate product of 200 milliliters. A portion of the filtrate was reacted with a standard solution of bromine and the unabsorbed excess bromine titrated to determine the amount of acrylamide originally in the filtrate solution. It was found that a yield of 40.8 percent of acrylamide was obtained based on the weight of acrylonitrile employed in the reaction.

*Example 2*

8300 parts by weight of the cation exchange resin of Example 1 was mixed with 380 parts by weight of water, containing about 1 part by weight of copper sulfate pentahydrate, by rolling the ingredients together in a pressure vessel for 1 hour. To the resulting mixture 797 parts by weight of acrylonitrile was added and the pressure vessel was sealed and the contents mixed by rolling for a further hour. The reaction vessel and contents were then heated to 100° and maintained at 100° with agitation for 4 hours. Thereafter the reaction vessel and contents were cooled to room temperature and the vessel was maintained under vacuum for a period of 2 hours to recover unreacted acrylonitrile. The residual reaction product was then extracted with successive portions of water to produce a total of 50,000 parts by weight of aqueous extract. Analysis showed that the extract contained 987 parts by weight of acrylamide, equivalent to a yield of 92.5 percent of theoretical based on the total amount of acrylonitrile employed in the reaction.

*Example 3*

Varying amounts of a cation exchange resin similar to that of Example 1 but containing 2.8 percent by weight of water were placed in sealable pressure vessels with 2.9 milliliters of water (including water already contained in the resin) and the sealed vessels were rolled on a power-driven roller for 4 hours to accomplish thorough mixing. The water contained about 0.01 gram of copper sulfate pentahydrate. Thereafter 10 milliliters of acrylonitrile was added to each vessel and mixed with the resin by rolling at room temperature overnight. The reaction vessels and contents were then heated at 100° C. for about 2 hours with continued agitation. At the end of this time the reaction mixtures were cooled to room temperature and unreacted acrylonitrile distilled off under vacuum. The residues were extracted with varying amounts of water. The extracts were analyzed for acrylamide content and for acrylic acid content. The results are summarized in the following table.

| Grams of Resin Employed | Volume of Extract, Milliliters | Percent Yield of— | |
|---|---|---|---|
| | | Acrylamide | Acrylic Acid |
| 30.4 | 306 | 52.4 | 5.1 |
| 55.2 | 500 | 76.9 | 2.1 |
| 83 | 750 | 82.4 | 0.8 |

The percentage yields in the above table are percent of theoretical based on the amount of acrylonitrile employed in the reaction.

*Example 4*

83 grams (0.45 mole) of cation exchange resin, recovered from operations such as the preceding examples and redried, and 8.1 milliliters (0.45 mole) of water, containing 0.01 gram of copper sulfate pentahydrate were mixed in a sealable pressure vessel and the mixture agitated by rolling the vessel for 1 hour. Thereafter 10 milliliters (0.15 mole) of acrylonitrile was added to the resin and water mixture. The vessel was closed and rolled for a further hour. The reaction vessel and contents were then heated gradually to a temperature of 100° C. and maintained at 100° C. for a period of 4 hours with constant agitation. The reaction vessel and contents were then cooled and allowed to stand at room temperature for about 64 hours. Thereafter unreacted acrylonitrile was distilled out of the reaction mixture under vacuum. The residue from the distillation was washed with successive portions of water to elute the product. 500 milliliters of dilute aqueous solution of acrylamide and acrylic acid was obtained as eluate. The yields of acrylamide and acrylic acid in the eluate were 56 and 28 percent of theoretical, respectively, based on the amount of acrylonitrile in the reaction.

I claim:
1. A method which comprises intimately mixing acrylonitrile, water and a sulfonic acid-type cation exchange resin in the acid form in the proportions of from 1.1 to 1.4 moles of water and from 2 to 3 equivalents of resin per mole of acrylonitrile and heating the resulting mixture at a temperature of from about 60° C. to about 120° C. under autogeneous pressure for a period of time to produce acrylamide as a major reaction product.
2. A method according to claim 1 wherein the heating is carried out at a temperature of from 90° C. to 110° C.
3. A method according to claim 1 wherein the resin is a sulfonated cross-linked polystyrene.
4. A method according to claim 1 which includes the additional step of cooling the reaction mass and extracting same with water to produce an aqueous solution of acrylamide as a product.
5. A continuous process which comprises the steps of mixing acrylonitrile, water and a sulfonic acid-type ion exchange resin in the acid form in the proportions of from about 1.1 to 1.4 moles of water and from 2 to 3 equivalents of resin per mole of acrylonitrile, conveying the resulting mixture into a closed zone heated to a temperature of from about 60° C. to about 120° C., maintaining the reaction mixture at said temperature for a period of at least 2 hours under autogenous pressure, withdrawing the resulting reaction mass from the heated zone, extracting the mass with water to separate an aqueous solution of acrylamide as a product and extracted wet resin as another product, drying said resin product and returning the dried resin to the initial step of the process.

References Cited in the file of this patent

UNITED STATES PATENTS 2,734,915    Jones _____ Feb. 14, 1956

FOREIGN PATENTS 966,955    Germany _____ Sept. 19, 1957

OTHER REFERENCES

Sussman: "Industrial and Engineering Chemistry," vol. 38, No. 12, pages 1228–1230 (1946).
Galat: "Journal American Chemical Society," vol. 70, page 3945 (1948).
Nachod: Ion Exchange, 1949, pages 266–7.
Kressman: Manufacturing Chemist, November 1956, pages 454–458 (pages 457–8 relied on).
Calmon et al.: "Ion Exchangers in Organic and Biochemistry," pub. by Interscience Publishers, Inc., New York, pages 658–687, pages 658, 659, 662–666 relied on (1957).